(No Model.)
J. G. HENDERSON.
TOE WEIGHT.
No. 456,146. Patented July 21, 1891.
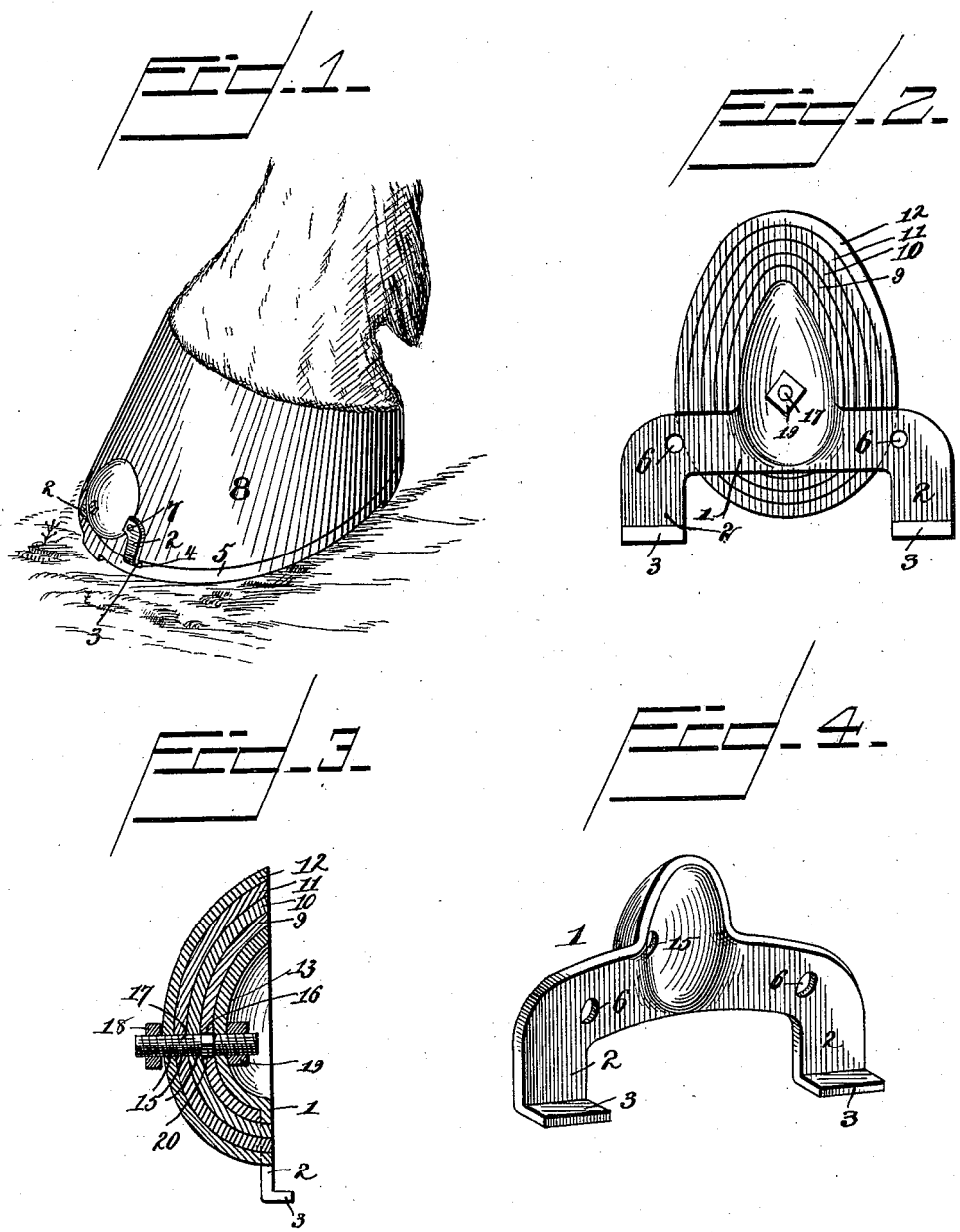
Witnesses:
H. G. Dieterich
W. S. Duvall
Inventor
Joseph G. Henderson
By his Attorneys,
C. A. Snow & Co.

UNITED STATES PATENT OFFICE.

JOSEPH G. HENDERSON, OF FORT DODGE, IOWA.

TOE-WEIGHT.

SPECIFICATION forming part of Letters Patent No. 456,146, dated July 21, 1891.

Application filed February 4, 1891. Serial No. 380,149. (No model.)

*To all whom it may concern:*

Be it known that I, JOSEPH G. HENDERSON, a citizen of the United States, residing at Fort Dodge, in the county of Webster and State of Iowa, have invented a new and useful Toe-Weight, of which the following is a specification.

This invention relates to improvements in toe-weights; and the objects in view are to provide an adjustable weight adapted to be graduated or adjusted so as to be adapted for various horses and gaits; furthermore, to provide a secure means of attachment and to accomplish the adjustment without altering the direction of gravity of the weight.

With the above objects in view the invention consists in a series of graduated nested sections of concavo-convex form, in means for retaining the same together in a separable manner, and in means of attaching the weight thus constructed to the horse's hoof.

Referring to the drawings, Figure 1 is a general view of a horse's hoof, a weight constructed in accordance with my invention being in position thereon. Fig. 2 is a rear elevation. Fig. 3 is a vertical longitudinal section. Fig. 4 is a detail in perspective of the main or inner section of the weight.

Like numerals of reference indicate like parts in all the figures of the drawings.

In practicing my invention I employ a concavo-convex inner section or plate 1, of substantially pear shape, and from the opposite sides of the same extend diverging securing branches 2, having their extremities inwardly disposed, at at 3, and entering corresponding openings 4, formed in the toe of the shoe 5. At each side of its center the diverging branches 2 are provided with screw-openings 6, through which screws 7 are passed into the hoof 8. If desired, other means may be substituted for securing the main or inner section to the hoof or shoe, or to both, as may be preferred.

Upon the concavo-convex section 1 there is mounted a series of concavo-convex separable weight-sections designated as 9, 10, 11, and 12, respectively, beginning with that section adjacent to the inner section. These sections are all formed of metal, and are so graduated as to size as to readily nest and combine to form a solid weight. The edges of the sections are transversely recessed, as at 13, and in the same lie the branches 2. A perforation 15 is made through the several sections, said perforation being cylindrical, with the exception of the one in the second section, or that one designated as 9, and this one is provided with a rectangular perforation 16. A bolt 17 is passed through these perforations, the opposite ends of the bolt being threaded to receive inner and outer nuts designated as 18 and 19, respectively, and serving to bind the sections snugly together. The inner nut rests within the concavity of the inner section 1. It will be observed that the bolt is provided with a rectangular portion 20, which registers with and passes through the corresponding opening of the weight-section 9, and by means of the same the bolt is prevented from turning.

It will be observed that by moving the outer nut any number of the weighted sections may be removed and the weight thus reduced, or any number may be added and the weight increased, and in all instances the center of gravity remains the same, contrary to the weights usually employed, which are adjustable only at their upper ends.

Having described my invention, what I claim is—

1. The herein-described toe-weight, consisting of a series of convavo-convexed weight sections or plates nested together, the inner or securing section being provided with diverging securing branches adapted to be inserted into openings formed in the shoe and the remaining sections provided with transverse recesses at their edges for the reception of the branches and perforations through their bodies, the perforation of one section being square, a bolt passed through the sections and having a squared portion fitting a square perforation formed in one of said sections, and nuts mounted on opposite ends of the bolt, substantially as specified.

2. The herein-described toe-weight, consisting of a series of concavo-convexed weight sections or plates nested together, the inner or securing section being adapted to be secured to the hoof, each section being of a size adapting it to include the preceding section, and a bolt passed through the series of sections and having a nut at its outer end, substantially as specified.

In testimony that I claim the foregoing as my own I have hereto affixed my signature in presence of two witnesses.

JOSEPH G. HENDERSON.

Witnesses
JOHN WALFINGER,
GEO. W. HYATT.